US012390927B2

(12) United States Patent
Chang et al.

(10) Patent No.: US 12,390,927 B2
(45) Date of Patent: Aug. 19, 2025

(54) CONTROL METHOD, GIMBAL, MOBILE PLATFORM SYSTEM, AND COMPUTER-READABLE STORAGE MEDIUM

(71) Applicant: SZ DJI TECHNOLOGY CO., LTD., Shenzhen (CN)

(72) Inventors: Xianmao Chang, Shenzhen (CN); Guozheng Lu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 769 days.

(21) Appl. No.: 17/650,397

(22) Filed: Feb. 9, 2022

(65) Prior Publication Data

US 2022/0266450 A1 Aug. 25, 2022

Related U.S. Application Data

(63) Continuation of application No. PCT/CN2019/100465, filed on Aug. 13, 2019.

(51) Int. Cl.
| | |
|---|---|
| *F16M 11/12* | (2006.01) |
| *B25J 9/10* | (2006.01) |
| *B25J 9/16* | (2006.01) |
| *B25J 15/00* | (2006.01) |
| *F16M 11/18* | (2006.01) |

(52) U.S. Cl.
CPC ........... *B25J 9/1664* (2013.01); *B25J 9/1005* (2013.01); *B25J 9/1641* (2013.01); *B25J 15/0019* (2013.01); *F16M 11/12* (2013.01)

(58) Field of Classification Search
CPC .... B25J 15/0019; B25J 9/1005; B25J 9/1641; B25J 9/1664; F16M 11/12; F16M 11/2064; F16M 11/18; F16M 11/123
See application file for complete search history.

(56) References Cited

U.S. PATENT DOCUMENTS

| | | | | |
|---|---|---|---|---|
| 9,030,149 B1 * | 5/2015 | Chen | ...................... | F16M 11/04 |
| | | | | 318/648 |
| 9,458,963 B1 * | 10/2016 | Choi | ...................... | F16M 11/10 |
| 10,054,258 B2 * | 8/2018 | Wang | ................... | G03B 17/561 |
| 10,458,596 B2 * | 10/2019 | Tian | ...................... | G03B 17/563 |

(Continued)

FOREIGN PATENT DOCUMENTS

| CN | 107094368 A | * | 8/2017 | ........... G01R 31/327 |
|---|---|---|---|---|
| CN | 108780328 A | * | 11/2018 | |

(Continued)

OTHER PUBLICATIONS

The World Intellectual Property Organization (WIPO) International Search Report for PCT/CN2019/100465 Apr. 26, 2020 5 Pages (including translation).

*Primary Examiner* — Thai T Dinh
(74) *Attorney, Agent, or Firm* — ANOVA LAW GROUP, PLLC

(57) ABSTRACT

A control method of a gimbal includes in response to the gimbal being in a sleeping mode and receiving a push-pull operation on a frame of the gimbal, obtaining a current target joint angle according to an actual joint angle of a motor arranged at the frame and configured to rotate the frame and controlling the motor according to the current target joint angle. The actual joint angle corresponds to a position where the push-pull operation reaches.

20 Claims, 15 Drawing Sheets

(56) References Cited

U.S. PATENT DOCUMENTS

| | | | |
|---|---|---|---|
| 10,801,659 B2 * | 10/2020 | Ma | F16M 11/08 |
| 11,085,574 B2 * | 8/2021 | Ma | F16M 11/2057 |
| 11,629,815 B2 * | 4/2023 | Wang | F16M 13/022 |
| | | | 318/638 |
| 11,675,255 B2 * | 6/2023 | Li | F16M 11/205 |
| | | | 396/420 |
| 2014/0301730 A1 | 10/2014 | Johnson et al. | |
| 2017/0227162 A1 * | 8/2017 | Saika | H04N 23/50 |
| 2019/0154191 A1 * | 5/2019 | Ma | F16M 11/08 |

FOREIGN PATENT DOCUMENTS

| | | |
|---|---|---|
| JP | 2017059955 A | 3/2017 |
| JP | 2018055704 A | 4/2018 |
| WO | 2019148348 A1 | 8/2019 |
| WO | 2019148446 A1 | 8/2019 |

\* cited by examiner

US 12,390,927 B2

CONTROL METHOD, GIMBAL, MOBILE PLATFORM SYSTEM, AND COMPUTER-READABLE STORAGE MEDIUM

CROSS-REFERENCE TO RELATED APPLICATION

This application is a continuation of International Application No. PCT/CN2019/100465, filed Aug. 13, 2019, the entire contents of which are incorporated herein by reference.

TECHNICAL FIELD

The present disclosure relates to the gimbal technology field and, more particularly, to a control method, a gimbal, a mobile platform system, and a computer-readable storage medium.

BACKGROUND

A gimbal usually clamps a mobile terminal, e.g., a cellphone, to implement photographing. During a photographing process, if the cellphone needs to be operated, for example, when a user receives or makes a phone call or browses captured images, the user cannot quickly dismount the cellphone from the gimbal because the cellphone is tightly clamped. If the gimbal is closed without the cellphone being dismounted, the gimbal motor will stop providing power. Thus, frames of the gimbal are in a completely free state and swing back and forth. At this time, when the user wants to operate the cellphone, the user needs to hold the cellphone and hold on to the handle of the gimbal to prevent the gimbal from swinging. Thus, it is very inconvenient to operate a cellphone.

SUMMARY

Embodiments of the present disclosure provide a control method of a gimbal. The method includes in response to the gimbal being in a sleeping mode and receiving a push-pull operation on a frame of the gimbal, obtaining a current target joint angle according to an actual joint angle of a motor arranged at the frame and configured to rotate the frame and controlling the motor according to the current target joint angle. The actual joint angle corresponds to a position where the push-pull operation reaches.

Embodiments of the present disclosure provide a gimbal, including a frame, a motor, and a processor. The motor is arranged at the frame and configured to rotate the frame. The processor is electrically connected to the motor and is configured to in response to the gimbal being in a sleeping mode and receiving a push-pull operation on the frame, obtain a current target joint angle according to an actual joint angle of the motor and control the motor according to the current target joint angle. The actual joint angle corresponds to a position where the push-pull operation reaches.

Embodiments of the present disclosure provide a mobile platform system, including a carrier and a gimbal. The gimbal is mounted at the carrier and includes a frame, a motor, and a processor. The motor is arranged at the frame and configured to rotate the frame. The processor is electrically connected to the motor and is configured to in response to the gimbal being in a sleeping mode and receiving a push-pull operation on the frame, obtain a current target joint angle according to an actual joint angle of the motor and control the motor according to the current target joint angle. The actual joint angle corresponds to a position where the push-pull operation reaches.

DETAILED DESCRIPTION OF THE EMBODIMENTS

Figure 1:
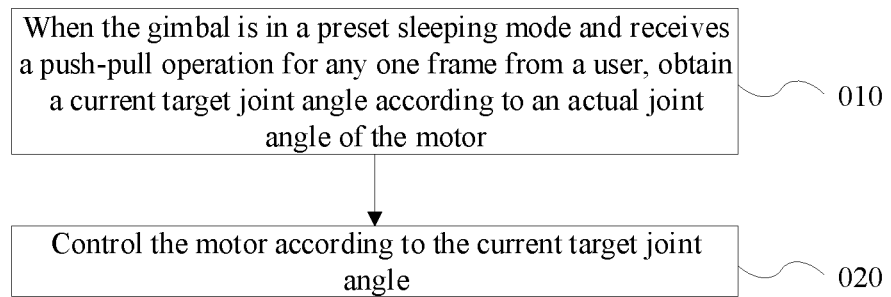
FIG. 1 is a schematic flowchart of a control method according to some embodiments of the present disclosure.

Embodiments of the present disclosure are described in detail below. Examples of embodiments of the present disclosure are shown in the accompanying drawings. The same or similar reference numerals indicate the same or similar elements or elements with the same or similar functions. The following embodiments described with reference to the accompanying drawings are exemplary, and are only used to explain the present disclosure, and should not be understood as a limitation to the present disclosure.

Figure 2:
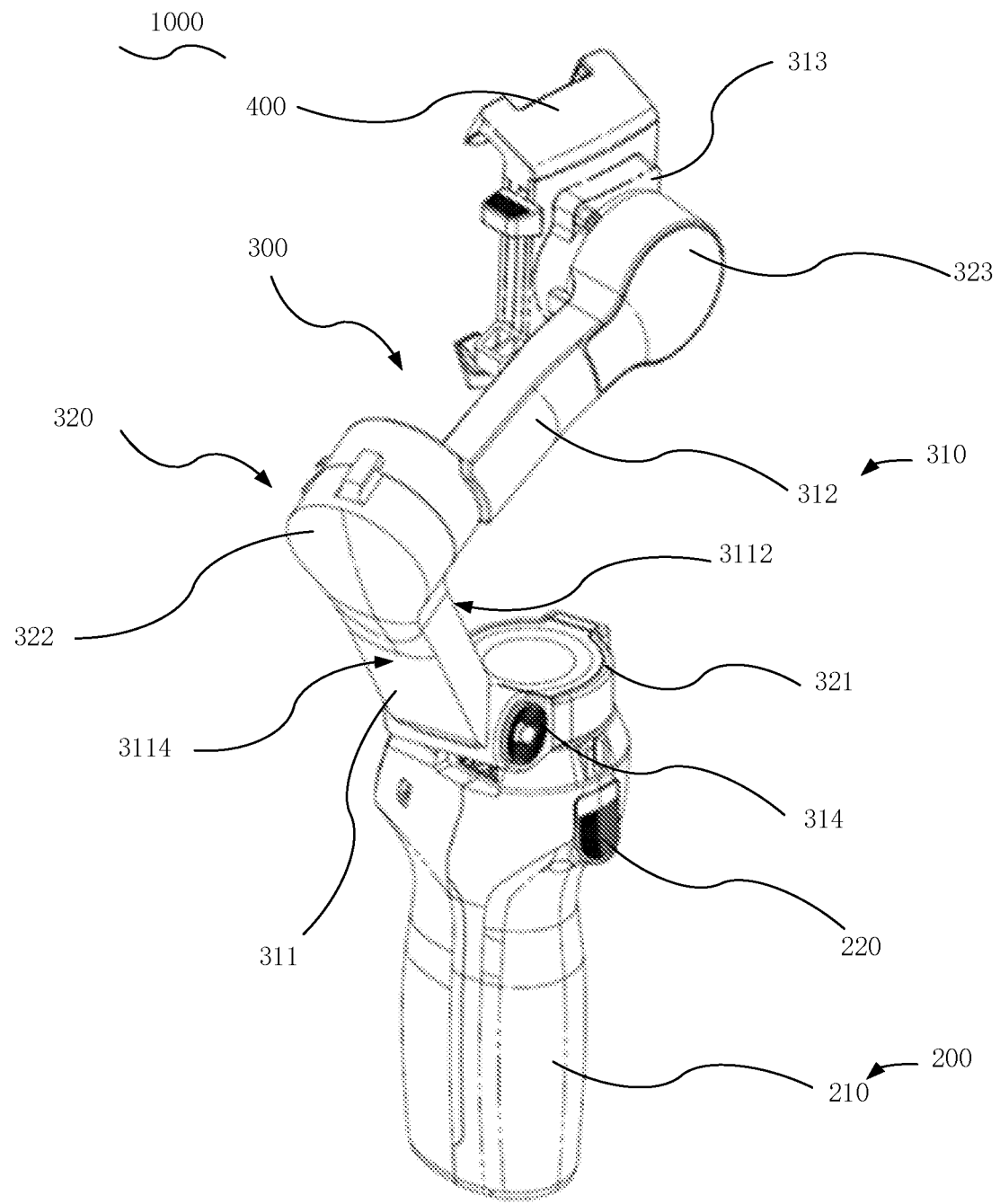
FIG. 2 is a schematic perspective structural diagram of a handheld gimbal, the handheld gimbal being in an expanded state, according to some embodiments of the present disclosure.

Referring to FIG. 1 and FIG. 2, embodiments of the present disclosure provide a control method applied to a gimbal 300. The gimbal 300 includes at least one frame 310 and a motor 320 arranged correspondingly at each frame 310 and configured to control the frame 310 to rotate. The control method includes when the gimbal 300 is in a preset sleeping mode and receives a push-pull operation for any one frame 310 from a user, obtaining a current target joint angle according to an actual joint angle of the motor 320, the actual joint angle corresponding to a position reached resulting from the push-pull operation (010), and controlling the motor 320 according to the current target joint angle (020).

The sleeping mode of embodiments of the present disclosure may be different from a stabilization mode. The sleeping mode may use a joint angle control mode. Compared with an attitude control mode used by the stabilization mode, control accuracy may be reduced. However, in the sleeping mode, the gimbal may not need to be stabilized and have low requirements of accuracy. Moreover, a control process may be simpler. In the sleeping mode, various members of the gimbal may still be in operation, and only the control mode may be changed.

Figure 3:
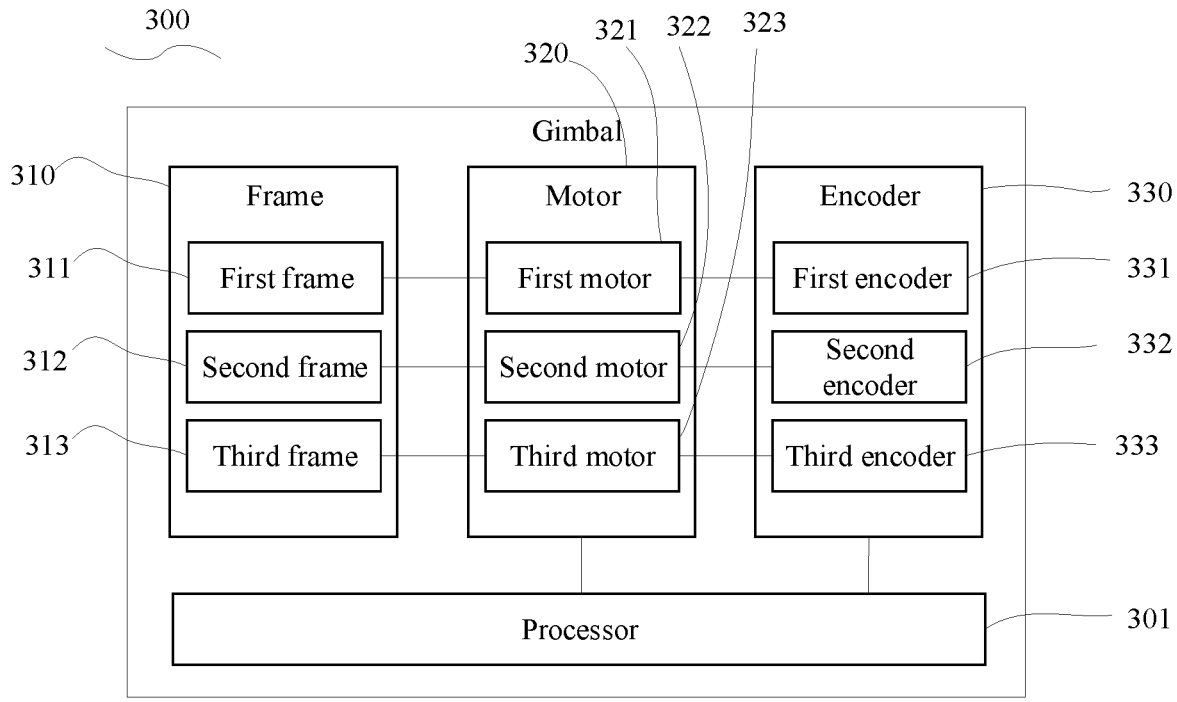
FIG. 3 is a schematic structural diagram of a gimbal according to some embodiments of the present disclosure.

Referring to FIG. 2 and FIG. 3, embodiments of the present disclosure provide the gimbal 300. The gimbal 300 includes one or more frames 310, the motor 320 arranged correspondingly at each frame 310 and configured to control the frame 310 to rotate, and a processor 301 electrically connected to the motor 320. When the gimbal 300 is in the preset sleeping mode and receives the push-pull operation for any one of the one or more frames 310 by the user, the processor 301 may be configured to obtain the current target joint angle according to the actual joint angle of the motor 320. The actual joint angle may correspond to the position where the push-pull operation reaches. The processor 301 may be further configured to control the motor 320 according to the target joint angle.

Referring again to FIG. 2, the gimbal 300 can include a single-axis gimbal, a dual-axis gimbal, a three-axis gimbal, etc. In the present disclosure, only the gimbal 300 as the three-axis gimbal may be taken as an example for description. The control methods and structures of other types of gimbals may be similar to the three-axis gimbal and will not be explained one by one. In some embodiments, the gimbal 300 includes a first frame 311, a second frame 312, and a third frame 313. The gimbal 300 further includes a first motor 321 corresponding to and connected to the first frame 311, a second motor 322 corresponding to and connected to the second frame 312, and a third motor 323 corresponding to and connected to the third frame 313. The first motor 321 is a yaw axis motor and configured to drive the first frame 311 to rotate around the yaw axis. The second motor 322 is a pitch axis motor and configured to drive the second frame 312 to rotate around the pitch axis. The third motor 323 is a roll axis motor and configured to drive the third frame 313 to rotate around the roll axis.

In the gimbal 300 and the control method applied to the gimbal 300, the sleeping mode may be added. When the gimbal 300 needs to be temporarily stopped for use, the cellphone may not need to be removed from the gimbal 300, and the gimbal 300 may be caused to enter the sleeping mode. In the sleeping mode, the user may push or pull the frame 310 to an arbitrary position and the frame 310 may be located at or near the arbitrary position. In some embodiments, the arbitrary position may correspond to the actual joint angle. During the push-pull process, the processor 301 may always obtain the current target joint angle according to the actual joint angle and control the motor 320 according to the current target joint angle. If the user no longer pushes or pulls the frame 310, the processor 301 may control the motor 320 according to the current target joint angle so that the motor 320 may be located at or close to the current target joint angle. Thus, the frame 310 and the cellphone fixed at the frame 310 may be pushed or pulled to the arbitrary position and be located at or near the arbitrary position. In the arbitrary position, a suitable position may always exist for the user to make a phone call or browse the captured images. As such, the gimbal may adapt to the angle needs of different users to operate the cellphone. Users may adjust the angle of the cellphone according to their own operation habits to adapt to the need of each user to make the phone call or browse the captured images. Moreover, in the sleeping mode, the cellphone may not need to be removed from the gimbal 300, or the handle of the gimbal 300 may not need to be hold on, the user can make the phone call or browse the captured images, etc., without the problem of the frame 310 swinging. The operation is very convenient.

In the sleeping mode, the user can push-pull any of the one or more frames 310, and the gimbal 300 may control the motor 320 corresponding to the pushed or pulled frame 310 according to the user push-pull operation, so that the pushed or pulled frame 310 may be located near the location where the user wants to push. For example, when the user pushes or pulls the first frame 311 and wants to push or pull the first frame 311 to a first position (correspondingly, the first motor 321 may rotate by a first angle), during the push-pull process, the processor 301 may obtain the current target joint angle according to the actual joint angle of the first motor 321 and control the first motor 321 according to the current target joint angle. When the user lets go and does not push or pull the first frame 311, the processor 301 may control the first motor 321 according to the current target joint angle so that the first motor 321 may be located at or close to the current target joint angle. Thus, the first frame 311 may be pushed or pulled to an arbitrary position and located at or near the arbitrary position.

When the user pushes or pulls the second frame 312 and wants to push or pull the second frame 312 to a second position (correspondingly, the second motor 322 may rotate by a second angle), during the push-pull process, the processor 301 may obtain the current target joint angle according to the actual joint angle of the second motor 322 and control the second motor 322 according to the current target joint angle. When the user lets go and does not push or pull the second frame 312, the processor 301 may control the second motor 322 according to the current target joint angle so that the second motor 322 may be located at or close to the current target joint angle. Thus, the second frame 312 may be pushed or pulled to an arbitrary position and located at or near the arbitrary position.

When the user pushes or pulls the third frame 313 and wants to push or pull the third frame 313 to a third position (correspondingly, the third motor 323 rotates by a third angle), during the push-pull process, the processor 301 may obtain the current target joint angle according to the actual joint angle of the third motor 323 and control the third motor 323 according to the current target joint angle. When the user lets go and does not push or pull the third frame 313, the processor 301 may control the third motor 323 according to the current target joint angle so that the third motor 323 may be located at or close to the current target joint angle. Thus, the third frame 313 may be pushed or pulled to an arbitrary position and located at or near the arbitrary position. The first angle, the second angle, and the third angle may be different from each other, or all of them may be the same, or only any two of them may be the same.

The gimbal 300 may carry a load 400. The cellphone may be mounted at the load 400. If the load 400 is mounted on the third frame 313, only the third frame 313 may be pushed or pulled, or only the second frame 312 may be pushed or pulled, or only the first frame 311 may be pushed or pulled to cause the cellphone to reach a position that is convenient for the user to operate. Both of the third support 313 and the second support 312 may be pushed or pulled, or both of third support 313 and the first support 311 may be pushed or pulled, or both of the second support 312 and the first support 311 may be pushed or pulled, or all of the third frame 313, the second frame 312, and the first frame 311 may be pushed or pulled to cause the cellphone to reach the position that is convenient for the user to operate. The load 400 may also be directly pushed or pulled to indirectly implement a push-pull operation on each of the frame 310. Thus, the load 400 may reach a position that is convenient for the user to operate.

Figure 4:
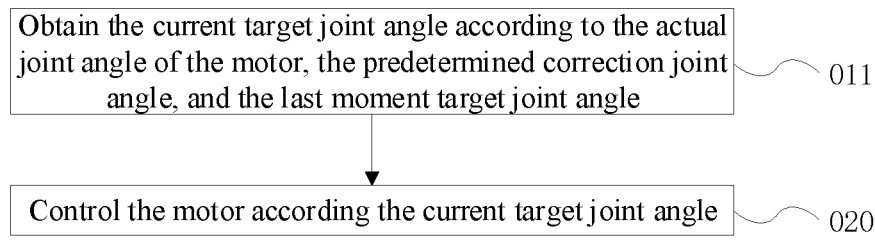
FIGS. 4 and 5 are schematic flowcharts of a gimbal control method according to some embodiments of the present disclosure.

Referring to FIG. 2 and FIG. 4, in some embodiments, obtaining the current target joint angle according to the actual joint angle of the motor 320 includes obtaining the current target joint angle according to the actual joint angle of the motor 320, the predetermined correction joint angle, and a last moment target joint angle. In this scenario, the control method includes obtaining the current target joint angle according to the actual joint angle of the motor 320, the predetermined correction joint angle, and the last moment target joint angle (011), and controlling the motor 320 according to the current target joint angle (020).

Figure 5:
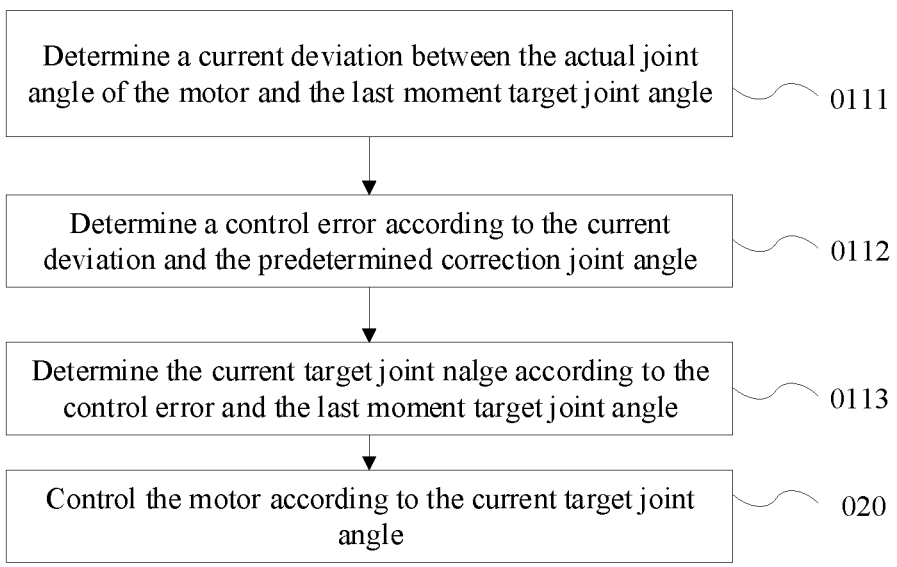

Referring to FIG. 2 and FIG. 5, in some embodiments, obtaining the current target joint angle according to the actual joint angle of the motor 320, the predetermined correction joint angle, and the last moment target joint angle includes determining a current deviation between the actual joint angle of the motor 320 and the last moment target joint angle (0111), determining a control error according to the current deviation and the predetermined correction joint angle (0112), and determining the current target joint angle according to the control error and the last moment target joint angle (0113).

In some embodiments, obtaining the current target joint angle according to the actual joint angle of the motor 320, the predetermined correction joint angle, and the last moment target joint angle further includes determining whether the current deviation is greater than the predetermined correction joint angle, and when the current deviation is greater than the predetermined correction joint angle, performing methods of 0112 or 0122. When the current deviation is less than or equal to the predetermined correction joint angle, the current target joint angle may be determined as the last moment target joint angle. Through above processes, the user may be prevented from accidentally touching or incorrectly detecting a hand push action due to the shaking of the gimbal.

In connection with FIG. 3, the processor 301 is further configured to obtain the current target joint angle according to the actual joint angle of the motor 320, the predetermined correction angle, and the last moment target joint angle. In some embodiments, the processor 301 is further configured to determine the current deviation according to the actual joint angle of the motor 320 and the last moment target joint angle, the control error according to the current deviation and the predetermined correction joint angle, and the current target joint angle according to the control error and the last moment target joint angle.

The actual joint angle may refer to the joint angle of the motor 320 corresponding to the position where the frame 310 is pushed by the user during the user push-pull operation. The actual joint angle may be a change value. A joint angle detected by an encoder 330 on the gimbal 300 may be the actual joint angle. The actual joint angle detected by the encoder 330 may be read by the processor 301. In some embodiments, the gimbal 300 may include three encoders 330, which are a first encoder 331, a second encoder 332, and a third encoder 333. The first encoder 331 may be configured to detect the joint angle of the first motor 321. The second encoder 332 may be configured to detect the joint angle of the second motor 322. The third encoder 333 may be configured to detect the joint angle of the third motor 323.

The predetermined correction joint angle may be a predetermined fixed joint angle. The predetermined correction joint angle may be in a range of (0, 10). For example, the predetermined correction joint angle may include any one of or any value between any two of 0.5°, 1°, 1.1°, 1.8°, 2°, 3°, 3.3°, 4°, 5°, 6°, 7°, 8°, 8.9°, 9°, and 10°. In some embodiments, the predetermined correction joint angle may be set when the gimbal 300 is shipped from the factory and be a fixed and unchangeable angle. In some other embodiments, although the predetermined correction joint angle may be set when the gimbal 300 is shipped from the factory, but may be changed by the manufacturer. For example, 9° when the gimbal 300 is shipped from the factory, during the application, if the user wants to make adjustments, the user can take the gimbal 300 back to the manufacturer to adjust to a smaller angle of 8° or to a larger angle of 10°. In still some other embodiments, the predetermined correction joint angle may be set by the user according to the actual application. For example, referring to FIG. 2, when the gimbal 300 is used in a mobile platform system 1000 of the present disclosure, the user may enter a desired angle by operating a button 220 of an operation handle 210, a touch screen, or a control terminal (not shown) communicated with the gimbal 300, which is not limited.

Figure 6:
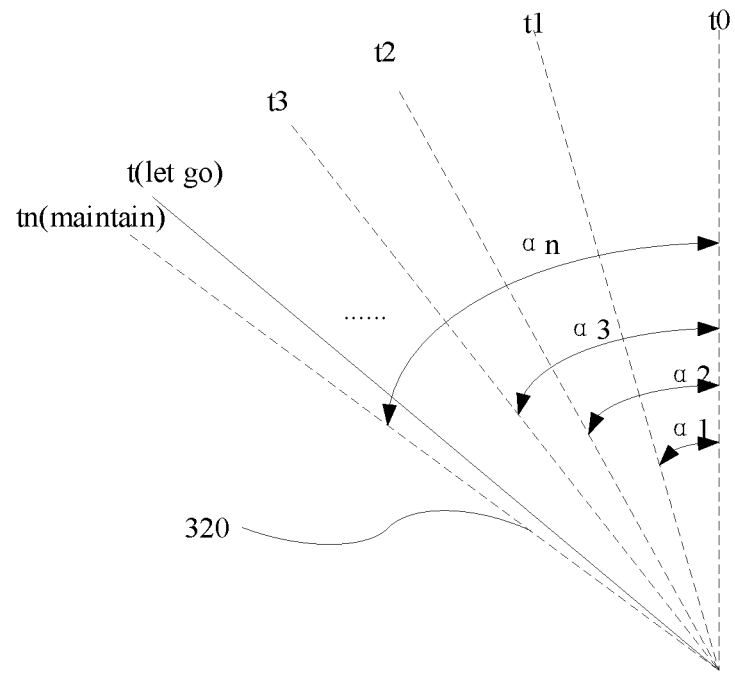
FIG. 6 is a schematic principle diagram of the gimbal control method according to some embodiments of the present disclosure.

Referring to FIG. 6, the last moment target joint angle is a target joint angle at a last moment of the current moment during the entire push-pull process. For example, assume at moment t0, the actual joint angle detected by the encoder 330 is $\alpha 0$ (the moment of the predetermined correction joint angle), and the target joint angle is $\theta 0$. At moment t1, the actual joint angle detected by the encoder 330 is $\alpha 1$, the target joint angle is $\theta 1$, and the last moment target joint angle (moment t0) is $\theta 0$. At moment t2, the actual joint angle detected by the encoder 330 is $\alpha 2$, the target joint angle is $\theta 2$, and the last moment target joint angle (moment t1) is $\theta 1$. At moment t3, the actual joint angle detected by the encoder 330 is $\alpha 3$, the target joint angle is $\theta 3$, and the last moment target joint angle (moment t2) is $\theta 2$. At moment tn, the actual joint angle detected by the encoder 330 is $\alpha n$, the target joint angle is $\theta n$, and the last moment target joint angle (moment tn−1) is $\theta n-1$.

If an represents the actual joint angle at moment tn, $\theta n$ represents the target joint angle at moment tn, $\gamma$ represents the predetermined correction joint angle, En represents the current deviation at moment tn, and en represents the control error at moment tn, calculating the target joint angle $\theta n$ at moment tn (current moment) includes calculating the current deviation En at moment tn according to formula $En=\alpha n-\theta n-1$, when En is greater than zero, calculating the control error en at moment tn according to $en=En-\gamma$, when En is less than zero, calculating the control error en at moment tn according to $en=En+\gamma$, and calculating the target joint angle at moment tn (current moment) according to $\theta n=\theta n-1+en$.

In some embodiments, referring to FIG. 6, the third frame 313 of the gimbal 300 is taken as an example to describe the process of calculating the current target joint angle. For example, assume that the predetermined correction joint angle is 5°. When the gimbal 300 is in sleeping mode and at moment t0, if the target joint angle $\theta 0$ of the third frame 313 is 0°, the actual joint angle detected by the encoder 330 is $\alpha 0$ is 5°. The target joint angle $\theta 0$ at moment t0 is the last moment target joint angle 0° at moment t1 when the push-pull is performed.

When the user pushes or pulls the third frame 313, at moment t1, the actual joint angle $\alpha 1$ detected by the third encoder 333 is 11°. To calculate the current target joint angle $\theta 1$ at moment t1, the processor 301 calculates a difference between the actual joint angle of 11° and the last moment target joint angle of 0° (t0) to obtain the current deviation of 11°. Then, the processor 301 calculates a difference between the current deviation of 11° and the predetermined correction joint angle of 5° to obtain the control error of 6°. Finally, the processor 301 calculates a sum of the control error of 6° and the last moment target joint angle of 0° to obtain the current target joint angle of 6° at moment t1.

Continuing at moment t2, the actual joint angle α2 detected by the third encoder 333 is 15°. In some embodiments, to calculate the current target joint angle θ2 at moment t2, the processor 301 calculates a difference between the actual joint angle of 15° and the last moment target joint angle of 6° (t1) to obtain the current deviation of 9°. Then, the processor 301 calculates a difference between the current deviation of 9° and the predetermined correction joint angle of 5° to obtain the control error of 4°. Finally, the processor 301 calculates a sum of the control error of 4° and the last moment target joint angle of 6° to obtain the current target joint angle of 10° at moment t2.

Continuing at time t3, the actual joint angle α3 detected by the third encoder 333 is 30°. In some embodiments, to calculate the current target joint angle θ3 at moment t3, the processor 301 calculates a difference between the actual joint angle of 30° and the last moment target joint angle of 10° (t2) to obtain the current deviation of 20°. Then, the processor 301 calculates a difference between the current deviation of 20° and the predetermined correction joint angle of 5° to obtain the control error of 15°. Finally, the processor 301 calculates a sum of the control error of 15° and the last moment target joint angle of 10° to obtain the current target joint angle of 25° at time t3.

As such, obtaining the current target joint angle θn at moment t0 may continue to be performed. If the user currently no longer pushes or pulls the third frame 313, the processor 301 may control the third motor 323 corresponding to the third frame 313 according to the current target joint angle θn. That is, when the user lets go, the third motor 323 may reverse to θn or near θn, and the third motor 323 may be controlled to oscillate within a predetermined range of θn through PID, for example, to oscillate within a range of plus or minus 3° of θn. By setting the predetermined correction joint angle, the motor 320 can only be located at or close to the current target joint angle θn. When the user pushes or pulls, the motor 320 will reverse to a certain angle to provide a sense of damping, which avoids a soft feeling in the push-pull process and improves the user experience.

Figure 7:
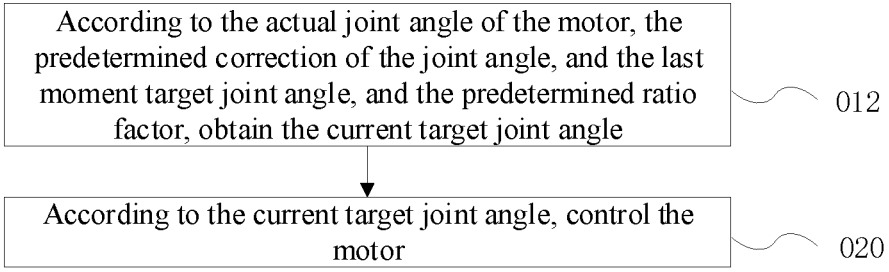
FIGS. 7 to 16 are schematic flowcharts of the gimbal control method according to some embodiments of the present disclosure.

Referring to FIG. 2 and FIG. 7, in some embodiments, obtaining the current target joint angle according to the actual joint angle of the motor 320 includes, according to the actual joint angle of the motor 320, the predetermined correction of the joint angle, and the last moment target joint angle, and a predetermined ratio factor, obtaining the current target joint angle. The control method includes according to the actual joint angle of the motor 320, the predetermined correction of the joint angle, and the last moment target joint angle, and the predetermined ratio factor, obtaining the current target joint angle (012), and according to the current target joint angle, controlling the motor 320 (020).

Figure 8:
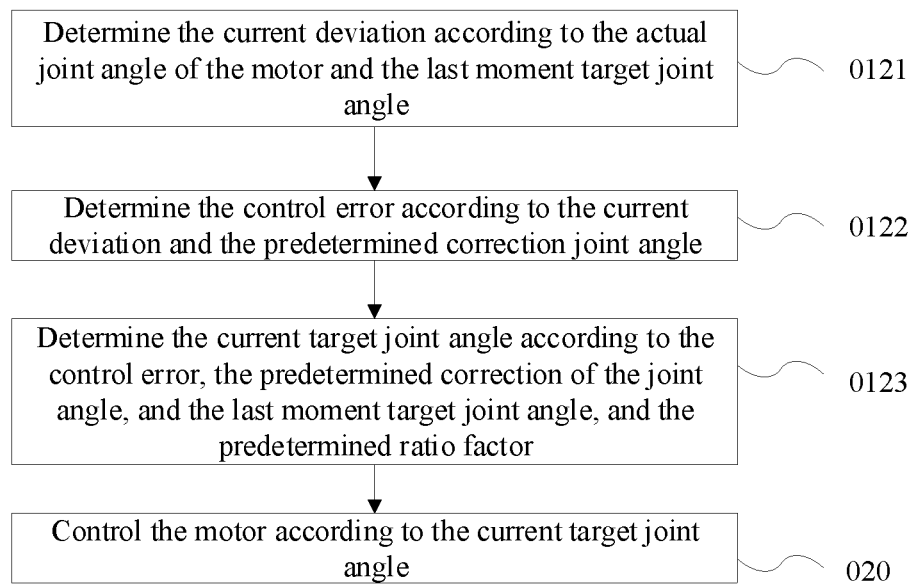

Referring to FIG. 2 and FIG. 8, in some embodiments, according to the actual joint angle of the motor 320, the predetermined correction of the joint angle, and the last moment target joint angle, and the predetermined ratio factor, obtaining the current target joint angle includes determining the current deviation according to the actual joint angle of the motor 320 and the last moment target joint angle (0121), determining the control error according to the current deviation and the predetermined correction joint angle (0122), and determining the current target joint angle according to the control error, the predetermined correction of the joint angle, and the last moment target joint angle, and the predetermined ratio factor (0123).

Referring to FIG. 3, the processor 301 is further configured to obtain the current target joint angle according to the actual joint angle of the motor 320, the predetermined correction joint angle, the last moment target joint angle, and the predetermined ratio factor. In some embodiments, the processor 301 is further configured to determine the current deviation according to the actual joint angle of the motor 320 and the last moment target joint angle, the control error according to the current deviation and the predetermined correction joint angle, and the current target joint angle according to the control error, the predetermined ratio facto, and the last moment target joint angle.

The explanations of the actual joint angle, the predetermined correction joint angle, and the last moment target joint angle are the same as the above, which are not repeated here. The predetermined ratio factor may be in the range of (0, 1], for example, any one value of or any value between any two values of 0.1, 0.2, 0.3, 0.4, 0.5, 0.6, 0.7, 0.8, 0.9, and 1.

Similarly, if αn represents the actual joint angle at moment tn, θn represents the target joint angle at moment tn, γ represents the predetermined correction joint angle, Kp represents the predetermined ratio factor, En represents the current deviation at moment tn, and en represents the current deviation at moment tn, calculating the target joint angle θn at moment tn (current moment) includes the following processes.

First, the current deviation En at moment tn is calculated according to formula En=αn−θn−1.

When En is greater than zero, the control error en at moment tn is calculated according to en=En−γ. When En is less than zero, the control error en at moment tn is calculated according to en=En+γ.

Then, the target joint angle at moment tn (current moment) is calculated according to θn=θn−1+en*Kp.

Similarly, referring to FIG. 6, the third frame 313 of the gimbal 300 is taken as an example to describe an iterative process of calculating the current target joint angle. For example, assuming that the predetermined correction joint angle is 5°, the predetermined ratio factor is 0.5, and the gimbal 300 is in the sleeping mode, and at moment t0, if the target joint angle θ0 of the third frame 313 is 0°, the actual joint angle α0 detected by the encoder 330 is 5°. The target joint angle θ0 at moment t0 is the last moment target joint angle of 0° at moment t1 when the push-pull is performed.

In iterative process 1, when the user pushes or pulls the third frame 313, at moment t1, the actual joint angle α1 detected by the third encoder 333 is 6°. To calculate the current target joint angle θ1 at moment t1, the processor 301 calculates the difference between the actual joint angle of 6° and the last moment (t0) target joint angle of 0° to obtain the current deviation of 6°. The processor 301 then calculates a difference between the current deviation of 6° and the predetermined correction joint angle of 5° to obtain the control error of 1°. Then, the processor 301 calculates a sum of a product of the control error of 1° and the predetermined ratio factor of 0.5 and the last moment (t0) target joint angle of 0° to obtain the current target joint angle of 0.5° at moment t1.

In iterative process 2, when the user pushes or pulls the third frame 313, at moment t2, the actual joint angle α2 detected by the third encoder 333 is 7°. To calculate the current target joint angle θ2 at moment t2, the processor 301 calculates the difference between the actual joint angle of 7° and the last moment (t1) target joint angle of 0.5° to obtain the current deviation of 6.5°. The processor 301 then calculates a difference between the current deviation of 6.5° and the predetermined correction joint angle of 5° to obtain the control error of 1.5°. Then, the processor 301 calculates a sum of a product of the control error of 1.5° and the predetermined ratio factor of 0.5 and the last moment (t1) target joint angle of 0.5° to obtain the current target joint angle of 1.25° at moment t2.

In iterative process 3, when the user pushes or pulls the third frame 313, at moment t3, the actual joint angle α3 detected by the third encoder 333 is 8°. To calculate the current target joint angle θ3 at moment t3, the processor 301 calculates the difference between the actual joint angle of 8° and the last moment (t2) target joint angle of 1.25° to obtain the current deviation of 6.75°. The processor 301 then calculates a difference between the current deviation of 6.75° and the predetermined correction joint angle of 5° to obtain the control error of 1.75°. Then, the processor 301 calculates a sum of a product of the control error of 1.75° and the predetermined ratio factor of 0.5 and the last moment (t2) target joint angle of 1.25° to obtain the current target joint angle of 2.125° at moment t3.

In iterative process 4, when the user pushes or pulls the third frame 313, at moment t4, the actual joint angle α4 detected by the third encoder 333 is 9°. To calculate the current target joint angle θ4 at moment t4, the processor 301 calculates the difference between the actual joint angle of 9° and the last moment (t3) target joint angle of 2.125° to obtain the current deviation of 6.875°. The processor 301 then calculates a difference between the current deviation of 6.875° and the predetermined correction joint angle of 5° to obtain the control error of 1.875°. Then, the processor 301 calculates a sum of a product of the control error of 1.875° and the predetermined ratio factor of 0.5 and the last moment (t3) target joint angle of 2.125° to obtain the current target joint angle of 3.0625° at moment t4.

As such, obtaining the current target joint angle θn at moment t0 may continue to be performed. If the user currently no longer pushes or pulls the third frame 313, the processor 301 may control the third motor 323 corresponding to the third frame 313 according to the current target joint angle θn to cause the third motor 323 to be located at or near the current target joint angle θn. That is, when the user lets go, the third motor 323 may reverse to θn or near θn, and the third motor 323 may be controlled to oscillate within the predetermined range of θn through PID, for example, to oscillate within a range of plus or minus 3° of θn.

In embodiments of the present disclosure, since the deviation of the target joint angle and the actual joint angle will not be too large, the control torque may be relatively small for the stabilization status. Thus, in the sleeping mode, the handle will not spin wildly when in the air.

Figure 9:
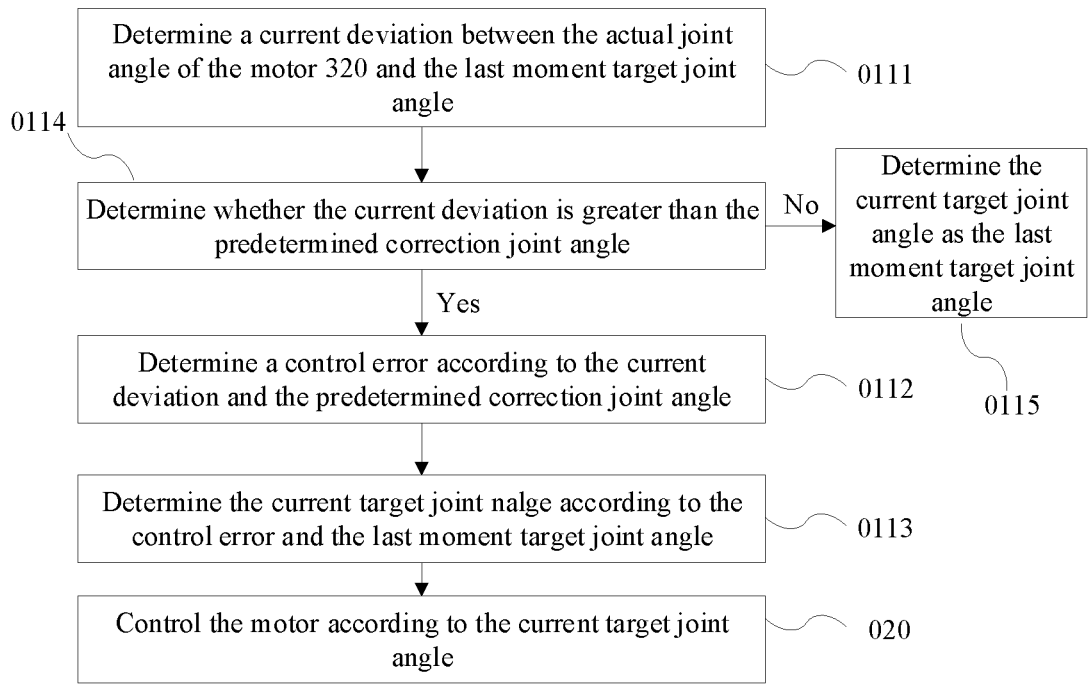
Figure 10:
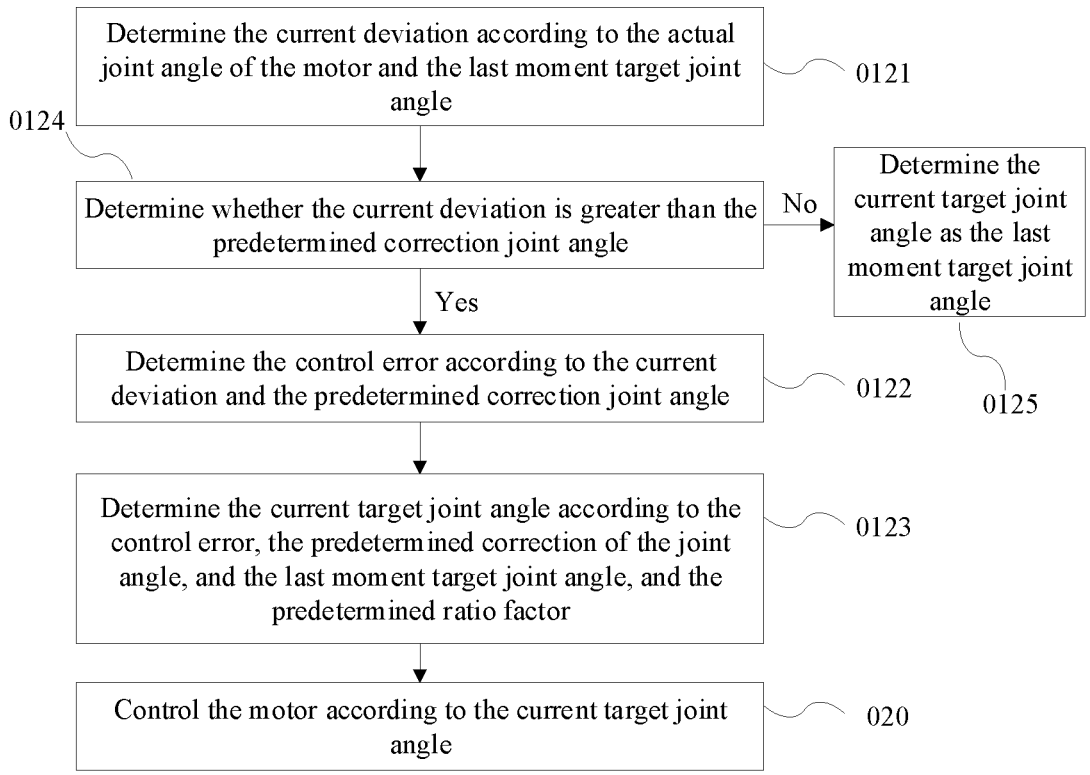

Referring to FIG. 9 and FIG. 10, in some embodiments, before the control error is determined according to the current deviation and the predetermined correction joint angle, the current deviation and the predetermined correction joint angle may be compared. That is, obtaining the current target joint angle according to the actual joint angle of the motor 320, the predetermined correction joint angle, and the last moment target joint angle further includes the following processes.

At 0114/0124, whether the current deviation is greater than the predetermined correction joint angle is determined.

When the current deviation is greater than the predetermined correction joint angle, the method at 0112 or 0122 is performed. When the current deviation is smaller than or equal to the predetermined correction joint angle, the method at 0115 or 0125 is performed.

At 0115/0125, the current target joint angle is determined as the last moment target joint angle.

Referring to FIG. 3, when the current deviation is greater than the predetermined correction joint angle, the processor 301 is further configured to determine the control error according to the current deviation and the predetermined correction joint angle. When the current deviation is smaller than or equal to the predetermined correction joint angle, the processor 301 is further configured to determine the current target joint angle as the last moment target joint angle.

The gimbal 300 is taken as an example. For example, assume that the predetermined correction joint angle is 5°, the gimbal 300 is in sleeping mode and at moment t0. If the target joint angle θ0 of the third frame 313 at moment t0 is 0°, and the actual joint angle α0 detected by the encoder 330 is 5°, the target joint angle θ0 at moment t0 is the last moment target joint angle 0° at moment t1 when the push-pull is performed.

At moment t1, if the actual joint angle α1 detected by the third encoder 333 is 6°, to calculate the current target joint angle θ1 at moment t1, the processor 301 calculates the difference between the actual joint angle of 6° and the last moment (t0) target joint angle of 0° to obtain the current deviation of 6°. Then, the processor 301 calculates the difference between the current deviation of 6° and the predetermined correction joint angle of 5° to obtain the control error of 1°. Then, the processor 301 calculates a sum of the product of the control error of 1° and the predetermined ratio factor of 0.5 and the last moment (t0) target joint angle of 0° to obtain the current target joint angle of 0.5° at moment t1.

At moment t2, if the actual joint angle α2 detected by the third encoder 333 is 7°, to calculate the current target joint angle θ2 at moment t2, the processor 301 calculates the difference between the actual joint angle of 7° and the last moment (t1) target joint angle of 0.5° to obtain the current deviation of 6.5°. Then, the processor 301 calculates the difference between the current deviation of 6.5° and the predetermined correction joint angle of 5° to obtain the control error of 1.5°. Then, the processor 301 calculates a sum of the product of the control error of 1.5° and the predetermined ratio factor of 0.5 and the last moment (t1) target joint angle of 0.5° to obtain the current target joint angle of 1.25° at moment t2.

As such, obtaining the current target joint angle θn at moment t0 may continue to be performed. If the user currently no longer pushes or pulls the third frame 313, that is, the third frame 313 is pushed to an ideal position (suitable for operations of making and receiving calls, viewing the images, etc.) where the user wants to reach. The processor 301 controls the third motor 323 corresponding to the third frame 313 according to the current target joint angle θn to cause the third motor 323 to be located at or near the current target joint angle θn. That is, when the user lets go, the third motor 323 may reverse to θn or near θn, and the third motor 323 may be controlled to oscillate within a predetermined range of θn through PID, for example, within the range of plus or minus 3° of θn.

The third frame 313 of the gimbal 300 is further taken as an example. For example, assume that the predetermined correction joint angle is 5°, and the gimbal 300 is in sleeping mode and at moment t0. If the target joint angle θ0 of the third frame 313 at moment t0 is 0°, and the actual joint angle α0 detected by the encoder 330 is 3°. The target joint angle θ0 at moment t0 is the last moment target joint angle of 0° of moment t1 when the push-pull is performed.

At moment t1, if the actual joint angle α1 detected by the third encoder 333 is 4°. To calculate the current target joint angle θ1 at moment t1, the processor 301 calculates the difference between the actual joint angle of 4° and the last moment (t0) target joint angle of 0° to obtain the current deviation of 4°. Since the current deviation of 4° is less than the predetermined correction joint angle of 5°, the processor 301 determines that the current target joint angle (target joint angle at moment t1) is the last moment target joint angle (target joint angle at moment t0) of 0°.

At moment t1, if the actual joint angle α1 detected by the third encoder 333 is 5°. To calculate the current target joint angle θ1 at moment t1, the processor 301 calculates the difference between the actual joint angle of 5° and the last moment (t0) target joint angle of 0° to obtain the current deviation of 5°. Since the current deviation of 4° is equal to the predetermined correction joint angle of 5°, the processor 301 determines that the current target joint angle (target joint angle at moment t1) is the last moment target joint angle (target joint angle at moment t0) of 0°.

Since the user will inevitably touch the gimbal 300 during practical applications, if the gimbal 300 is touched in the sleeping mode, the gimbal 300 will perform the above-mentioned action of obtaining the current target joint angle. If the user touches the gimbal 300 unintentionally, for example, toggles the third frame 313, and the third motor 323 may respond and stop near a toggled position, which is undoubtedly not what the user wants. In the control method and the gimbal 300 of embodiments of the present disclosure, by setting the predetermined correction joint angle, the subsequent action (methods at 0111~0113) of obtaining the current target joint angle may be performed only when the current deviation is greater than the predetermined correction joint angle. When the current deviation is less than or equal to the predetermined correction joint angle, the action of obtaining the current target joint angle may not be performed, but the current target joint angle may be directly determined as the last moment target joint angle. Such a setting may prevent the user from accidentally triggering an action (that is, an action of stopping at where pushing to) or prevent from mistakenly detecting a hand push action due to the shaking of the gimbal. The predetermined correction joint angle may be in the range of [5, 10]. When the predetermined correction joint angle is too large, for example, greater than 10°, the angle where the user wants to push to may be relatively small. When the predetermined correction joint angle is less than or equal to 10°, according to processes after 0114, the above-mentioned action of obtaining the current target joint angle may not be performed, which makes it impossible to adjust with a small angle to a position that is convenient for operating the cellphone. When the predetermined correction joint angle is too small, for example, less than 5°, the current deviation may be easily greater than 5°, the above-mentioned action of obtaining the current target joint angle will be performed according to processes after 0114. As such, the anti-fault trigger mechanism may be lost.

Figure 11:
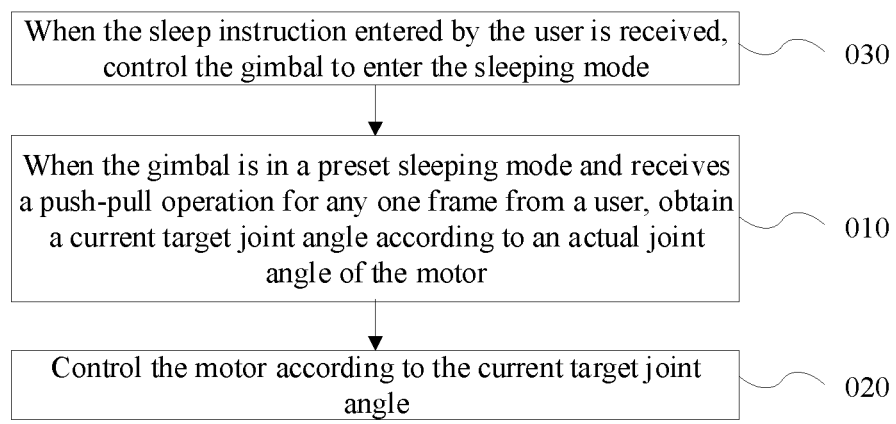

Referring to FIG. 2 and FIG. 11, in some embodiments, the control method further includes when the sleep instruction entered by the user is received, controlling the gimbal 300 to enter the sleeping mode (030).

Referring to FIG. 3, in the gimbal 300 of embodiments of the present disclosure, when receiving the sleep instruction entered by the user, the processor 301 may be further configured to control the gimbal 300 to enter the sleeping mode.

The gimbal 300 may be preset with the stabilization mode and the sleeping mode. The stabilization mode may refer to a normal operation mode of the gimbal 300. The stabilization mode may include a follow mode or a lock mode. The stabilization mode may include the follow mode and the lock mode. The user may operate the buttons of the gimbal 300 to switch the pan-tilt 300 from the stabilization mode to the sleeping mode or from the sleeping mode to the stabilization mode. For example, a button 220 may be arranged on the gimbal 300. When the gimbal 300 is in the stabilization mode, the user may press the button 220 twice. After the gimbal 300 receives a switch instruction, the processor 301 may control the gimbal 300 to switch from the stabilization mode to the sleeping mode. In some embodiments, when the gimbal 300 is in the sleeping mode, the user can also press the button 220 twice. After the gimbal 300 receives the switch instruction, the processor 301 may control the gimbal 300 to switch from the sleeping mode to the stabilization mode. For another example, the gimbal 300 may include a first button and a second button. When the gimbal 300 is in the stabilization mode, the user may press the first button twice. After the processor 301 receives the switch instruction input by the first button, the processor 301 may control the gimbal 300 to switch from the stabilization mode to the sleeping mode. In some other embodiments, when the gimbal 300 is in the sleeping mode, the user may press the second button three times. After the processor 301 receives the switch instruction input by the second button, the processor 301 may control the gimbal 300 to switch from the sleeping mode to the stabilization mode. In addition to the buttons, the switch instruction may also be transmitted from an external apparatus to the processor 301 through a touch screen or through wired or wireless transmission, which is not listed here.

In some embodiments, since the discreteness of the target joint angle will cause the hand feel stuck, a differential term in PID control may be reduced, so that the change of the target joint angle may not cause the hand feel stuck.

In some other embodiments, the proportional coefficient in PID control may be adjusted to cause the control torque of the motor not to be too small, thereby providing a good damping hand feel.

Figure 12:
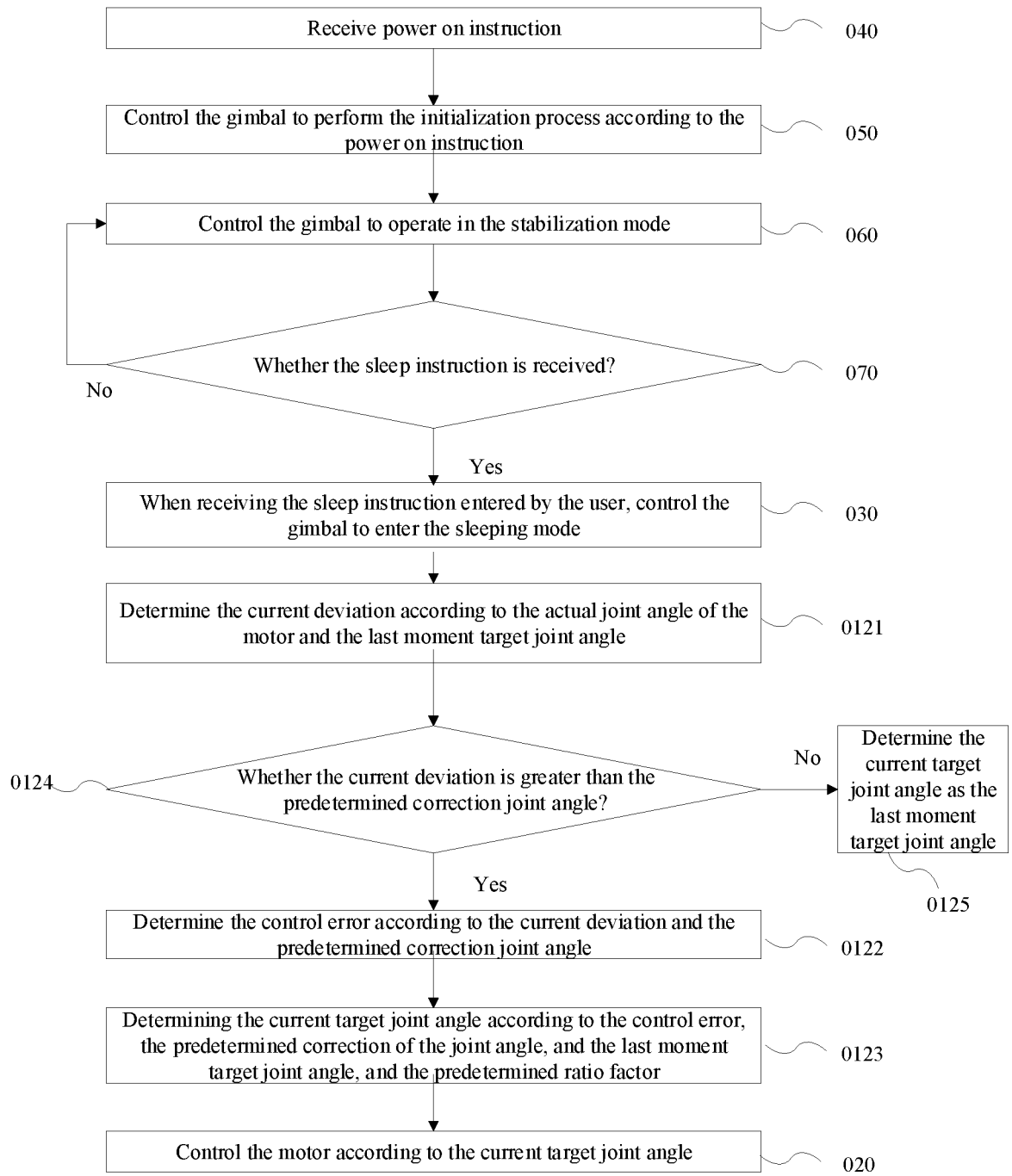

Referring to FIG. 12, in some embodiments, the control method further includes receiving a power-on instruction (040), controlling the gimbal 300 to perform an initialization process according to the power-on instruction (050), controlling the gimbal 300 to operate in the stabilization mode (060), determining whether the sleep instruction is received (070), and when receiving the sleep instruction entered by the user, controlling the gimbal 300 to enter the sleeping mode (030).

Referring to FIG. 3, in the gimbal 300 of embodiments of the present disclosure, the processor 301 may be further configured to receive the power-on instruction, control the gimbal 300 to perform the initialization process according to the power-on process, and control the gimbal 300 to operate in the stabilization mode. When receiving the sleep instruction entered by the user, the processor 301 may be further configured to control the gimbal 300 to enter the sleeping mode. When not receiving the sleep instruction entered by the user, the processor 301 may be further configured to control the gimbal 300 to operate in the stabilization mode.

A power button may be arranged at the gimbal 300. The user may power on the gimbal 300 by pressing the power button. When the processor 301 receives the power-on instruction, the processor 301 may power on the gimbal 300 according to the power-on instruction. The gimbal 300 may automatically perform an initialization process during the power-on process. When the gimbal 300 is powered on for the first time, the gimbal 300 may enter the stabilization mode according to the setting of the initialization process, that is, the normal operation mode. When the processor 301 receives the sleep instruction entered by the user, the processor 301 will switch the gimbal 300 from the stabilization mode to the sleeping mode.

When the gimbal 300 is in the sleeping mode, and before the gimbal 300 receives the user push or pull operation on any frame 310, the processor 301 may control the motor 320 to maintain at a predetermined angle. The predetermined angle may be the last moment target joint angle before the user pushes or pulls the any frame 310.

The predetermined angle may be an angle preset for the gimbal 300 during manufacturing. The angle may be the initial angle of the frame 310 before the user pushes or pulls after the frame 310 enters the sleeping mode. The third frame 313 is taken as an example. Assume that the predetermined angle of the third frame 313 in the sleeping mode is 0°. If the gimbal 300 is initially in the stabilization mode and the joint angle of the third frame 313 is 90°, then when the gimbal 300 enters the sleeping mode, the processor 301 may controls the third motor 323 of the third frame 313 to rotate from 90° to and maintain at the predetermined angle of 0°. When all frames 310 (motors 320) reach and maintain at the predetermined angles, the user may perform the push-pull action on each of the frames 310. Then, the processor 301 may perform the methods at 010 and 020 according to the user push-pull operation for each frame 310.

In some embodiments, the predetermined angle may also be the current joint angle of each frame 310 in the stabilization mode when the processor 301 receives the sleep instruction. The third frame 313 is still taken as an example. Assume that the joint angle of the third frame 313 is 50° when the gimbal 300 operates in the stabilization mode. When the processor 301 receives the sleep instruction entered by the user, the processor 301 may directly control the motor 320 of the third frame 313 to maintain at the joint angle of 50°. In this scenario, the user may perform the push-pull operation on each frame 310. Then, the processor 301 may perform the methods at 010 and 020 according to the user push-pull operation for each frame 310.

Figure 13:
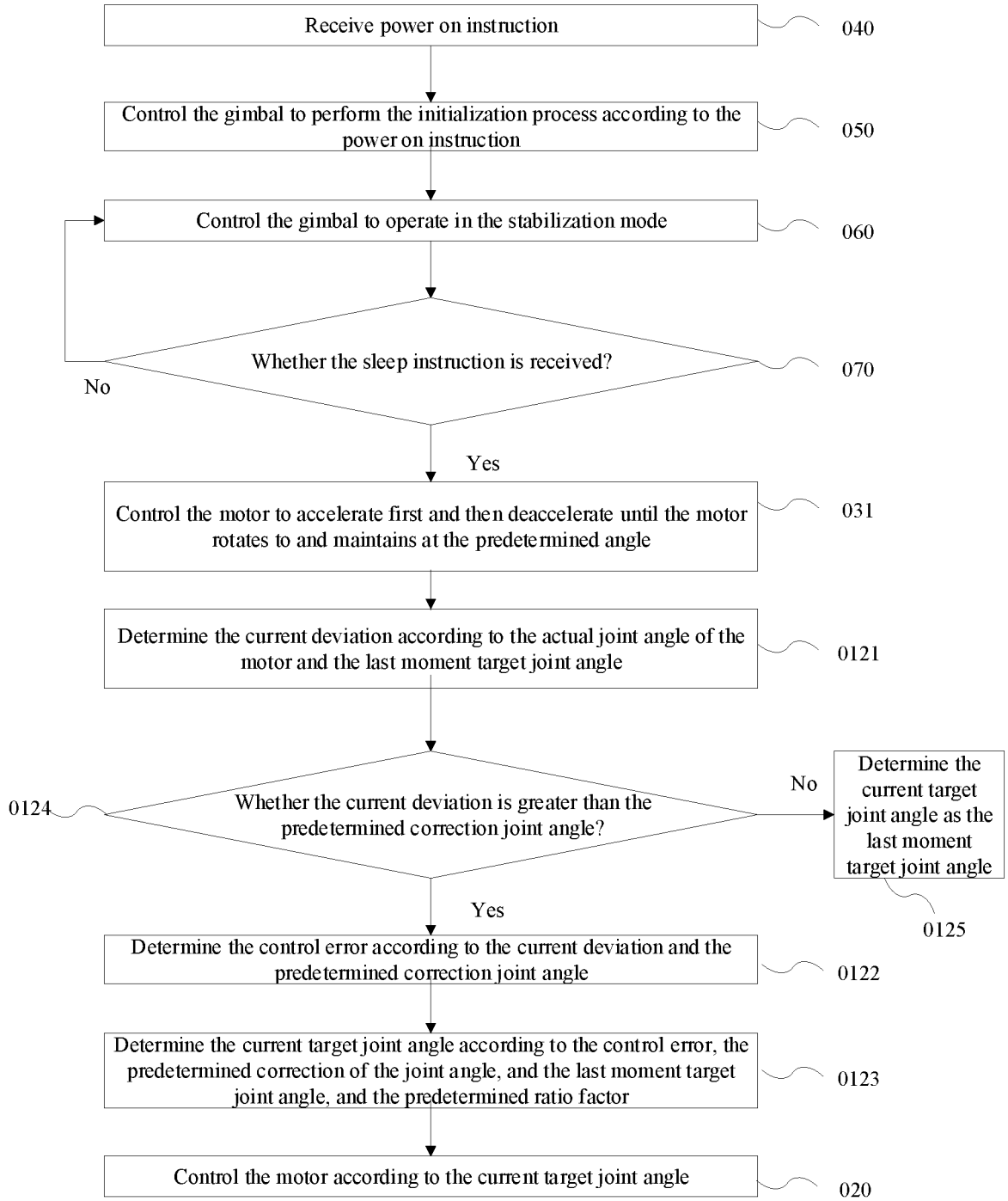

Referring to FIG. 13, in some embodiments, controlling the gimbal 300 to enter the sleeping mode includes controlling the motor 320 to accelerate first and then deaccelerate until the motor 320 rotates to and maintains at the predetermined angle (031).

Referring to FIG. 3, in the gimbal 300 of embodiments of the present disclosure, when receiving the sleep instruction entered by the user, the processor 301 may be further configured to control the motor 320 to accelerate and then decelerate until the motor 320 rotates to and maintains at the predetermined angle to control the gimbal 300 to smoothly enter the sleeping mode.

The third frame 313 is taken as an example. For example, the predetermined angle of the third frame 313 may be 0°. The joint angle of the third frame 313 may be 60° when the gimbal 300 is in the stabilization mode. After the processor 301 receives the sleep instruction entered by the user, the processor 301 may first control the third motor 323 corresponding to the third frame 313 to accelerate and rotate to near the predetermined angle of 0°, and then decelerate and rotate until the motor 320 rotates to the position of the predetermined angle of 0°. The processor 301 may control the motor 320 to maintain at the predetermined angle of 0°.

The acceleration and deceleration may be information instructions attached to the sleep instruction. For example, when switching from the stabilization mode to the sleeping mode, the processor 301 may obtain the current joint angle data of each frame 310 in the stabilization mode and compare the current joint angle data with the predetermined angle of each frame 310 to determine the angle that each frame 310 needs to rotate. The processor 301 may plan a smooth rotation solution. For example, when the motor 320 corresponding to the third frame 313 accelerates and rotates to about 30°, the processor 301 may control the third motor 323 corresponding to the third frame 313 to decelerate and rotate until the third motor 323 rotates to and maintains at the predetermined angle. The processor 301 may also control the third motor 323 to accelerate and rotate to a position of 10° first, and then decelerate and rotate to a position of 0°. These can be planned by the processor 301 according to the current joint angle and the predetermined angle.

Figure 14:
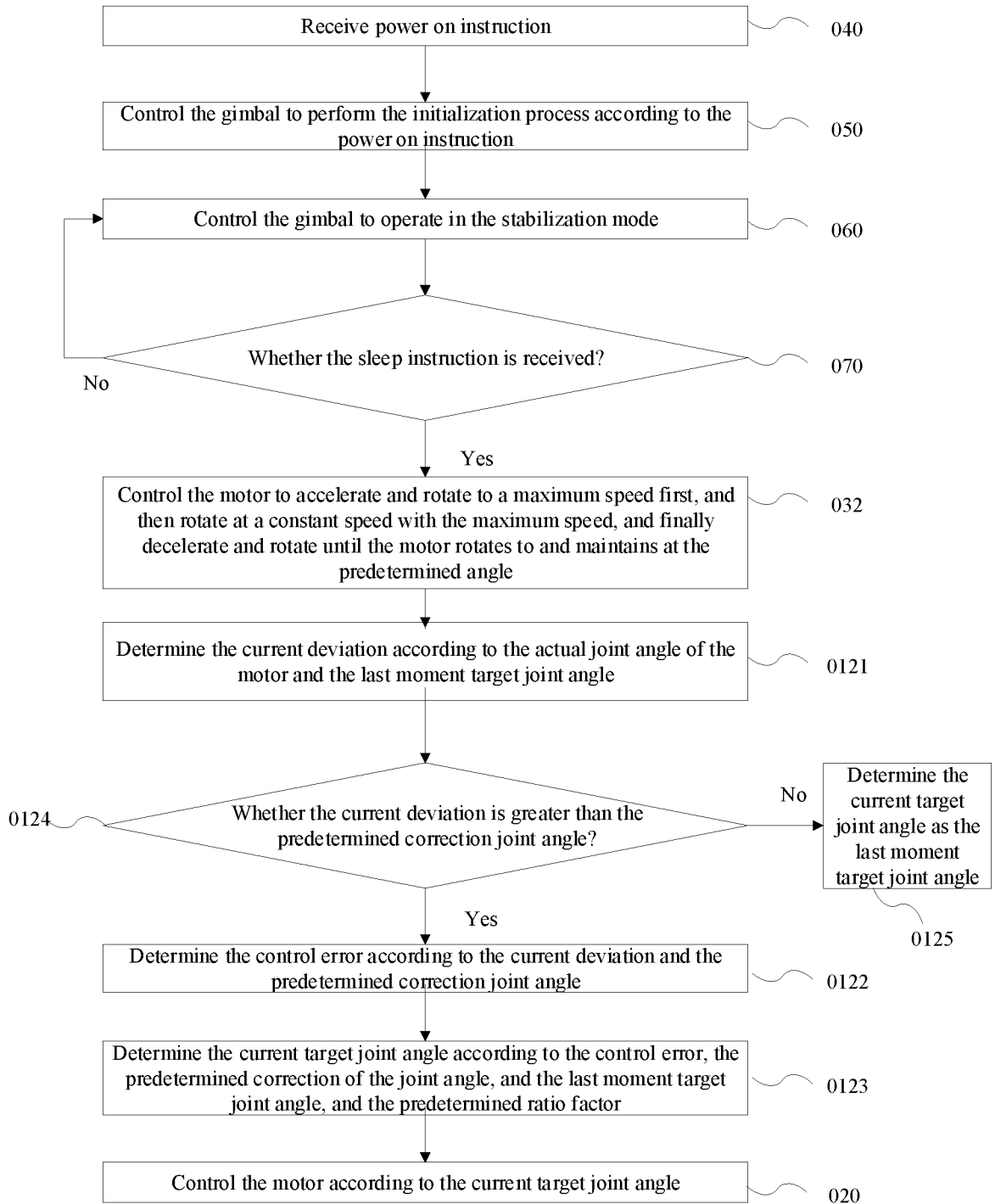

Referring to FIG. 14, in some embodiments, controlling the gimbal 300 to enter the sleeping mode includes controlling the motor 320 to accelerate and rotate to a maximum speed first, and then rotate at a constant speed with the maximum speed, and finally decelerate and rotate until the motor 320 rotates to and maintains at the predetermined angle (032).

Referring to FIG. 3, in the gimbal 300 of embodiments of the present disclosure, when receiving the sleep instruction entered by the user, the processor 301 may be further configured to control the motor 320 to accelerate and rotate to the maximum speed of the motor 320 first, then control the motor 320 to rotate at the constant speed with the maximum speed, and then control the motor 320 to decelerate and rotate until the motor 320 rotates to and maintains at the predetermined angle. Thus, the gimbal 300 may be controlled to smoothly enter the sleeping mode.

Figure 15:
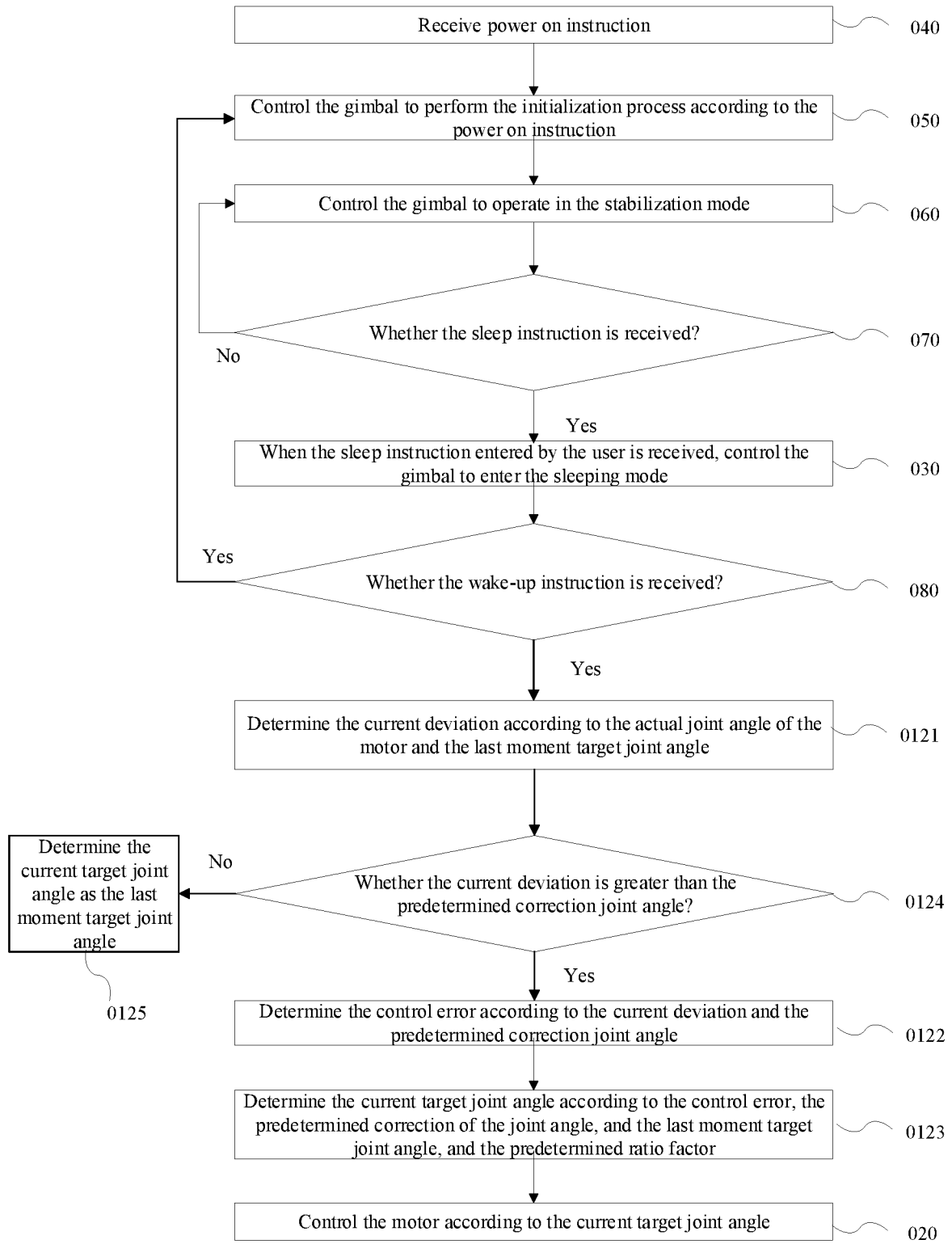

The third frame 313 is taken as an example. For example, the predetermined angle of the third frame 313 may be 0°. The joint angle of the third frame 313 may be 60° when the gimbal 300 is in the stabilization mode. After the processor 301 receives the sleep instruction entered by the user, the processor 301 may first control the third motor 323 corresponding to the third frame 313 to accelerate and rotate to the predetermined angle of 40°. Thus, the rotation speed of the motor 320 may reach the maximum speed. Then, the processor 301 may control the motor 320 to rotate at the constant speed with the maximum speed until the motor 320 rotates to 20°, and finally decelerate and rotate until the third motor 323 rotates to a position of the predetermined angle of 0°. The processor 301 may control the motor 320 to maintain at the predetermined angle of 0°. The acceleration rotation, the rotation at the constant speed, and the deceleration rotation may be information instructions attached to the sleep instruction. For example, when switching from the stabilization mode to the sleeping mode, the processor 301 may obtain the current joint angle data of each frame 310 in the stabilization mode, and compare the current joint angle data with the predetermined angle of each frame 310 to determine the angle that each frame 310 needs to rotate to. Then, the processor 301 may plan a smooth rotation solution. In the planned rotation solution in embodiments of the present disclosure, on one hand, the rotation process may be smooth and without jitter. On the other hand, since the motor 320 rotates at the maximum speed for a period of time, the rotation takes a short time to reach the predetermined angle. Referring to FIG. 15, in some embodiments, when the gimbal is in the sleeping mode, whether a wake-up instruction is received is determined (080), and when the wake-up instruction entered by the user is received, the gimbal 300 is controlled to perform the initialization process (050).

The wake-up instruction may be used to switch the gimbal 300 from the sleeping mode to the stabilization mode. The manner of the user entering the wake-up instruction may be similar to the mode switch described above, which is not repeated here.

Referring to FIG. 3, in the gimbal 300 of embodiments of the present disclosure, when the processor 301 receives the wake-up-up instruction entered by the user, the processor 301 may control the gimbal 300 to perform the initialization process. After the gimbal 300 performs the initialization process, the gimbal 300 may enter the stabilization mode and operate normally. When not receiving the wake-up instruction entered by the user and receiving the user push or pull operation on any frame 310, the processor 301 may determine the current deviation according to the actual joint angle of the motor 320 and the last moment target joint angle.

Figure 16:
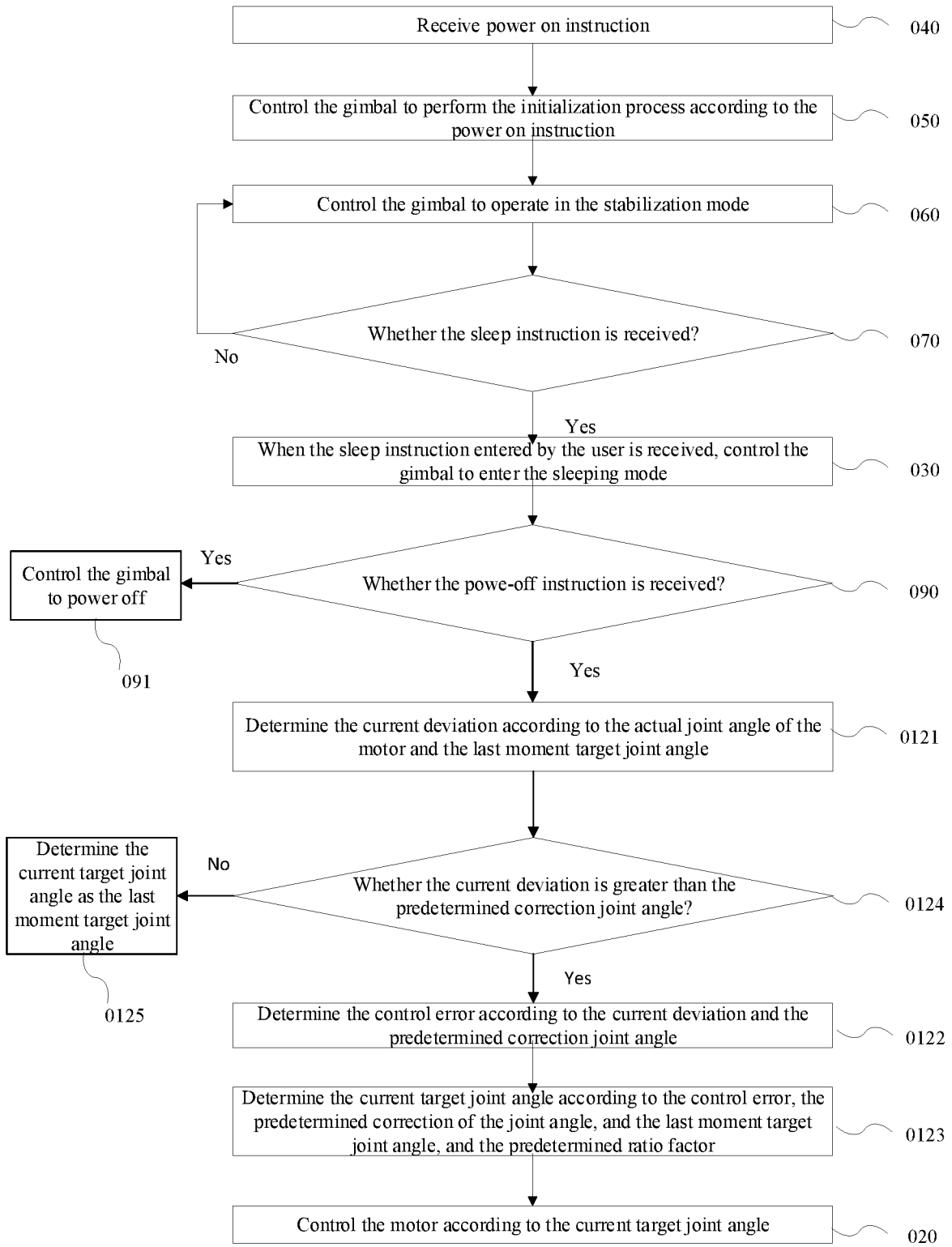

Referring to FIG. 16, in some embodiments, when the gimbal 300 is in the sleeping mode, the control method further includes determining whether a power-off instruction is received (090), and when the power-off instruction entered by the user is received, controlling the gimbal 300 to power off (091).

Referring to FIG. 3, in the gimbal 300 of embodiments of the present disclosure, when the gimbal 300 is in the sleeping mode, the processor 301 receives the power-off instruction entered by the user, controlling the gimbal 300 to power off.

The gimbal 300 may directly perform power off in the sleeping mode according to the power-off instruction entered by the user, which avoids that the gimbal 300 has to be switched from the sleeping mode to the stabilization mode to power off, when the gimbal 300 is in the sleeping mode, which saves the operation process.

Figure 17:
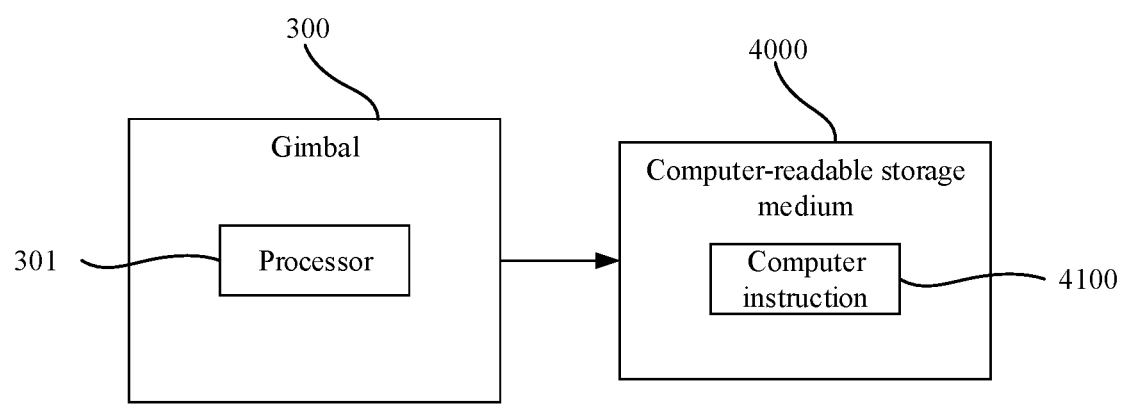
FIG. 17 is a schematic diagram showing a connection between the gimbal and a computer-readable storage medium according to some embodiments of the present disclosure.

Referring to FIG. 17 and FIG. 3, embodiments of the present disclosure provide a computer-readable storage medium 4000 containing computer instructions 4100. When the computer instructions 4100 are executed by the processor 301, the processor 301 may be caused to perform the control method of any of the foregoing embodiments.

Referring to FIG. 2, the present disclosure further provides a mobile platform system 1000. The mobile platform system 1000 includes the gimbal 300 of any embodiment above and a carrier 200. The gimbal 300 is mounted on the carrier 200.

Figure 18:
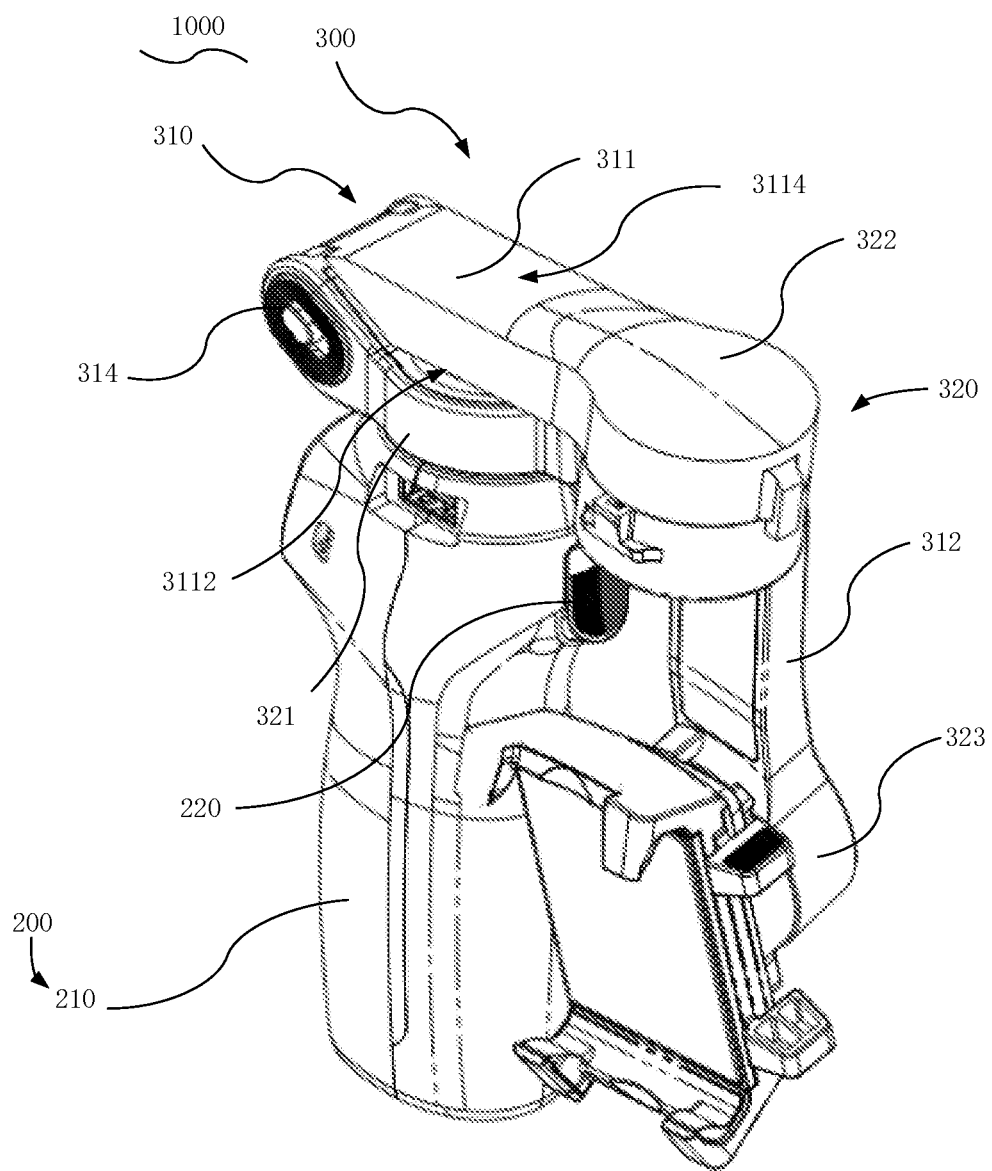
FIG. 18 is a schematic perspective structural diagram of the handheld gimbal, the handheld gimbal being in a storage state, according to some embodiments of the present disclosure.

Referring to FIG. 3 and FIG. 18, the mobile platform system 1000 is a handheld gimbal. The handheld gimbal includes the carrier 200 and the gimbal 300. The carrier 200 includes a handle 210. A button 220 electrically connected to the processor 301 may be arranged on the handle 210. The gimbal 300 may further include a rotation member 314 connecting the first frame 311 and the first motor 321. The first frame 311 may rotate relative to the first motor 321. In some embodiments, the first frame 311 includes a first surface 3112 and a second surface 3114. In an unfolded state of the handheld gimbal, the first surface 3122 may face a side where the first motor 321 is located. When the first frame 311 rotates relative to the first motor 321 through the rotation member 314, the first frame 311 may rotate to a position where the first surface 3112 directly faces or is even attached to the first motor 321. Thus, the gimbal 300 may enter the storage state. By arranging the rotation member 314, the gimbal 300 may be switched between the storage state and the unfolded state. When the gimbal 300 is in the storage state, the handheld gimbal may occupy a smaller space and be more portable. In addition, the handheld gimbal may also include a clamping member 400 for clamping the load. The load may be a cellphone, a camera, etc., to facilitate image capturing.

Figure 19:
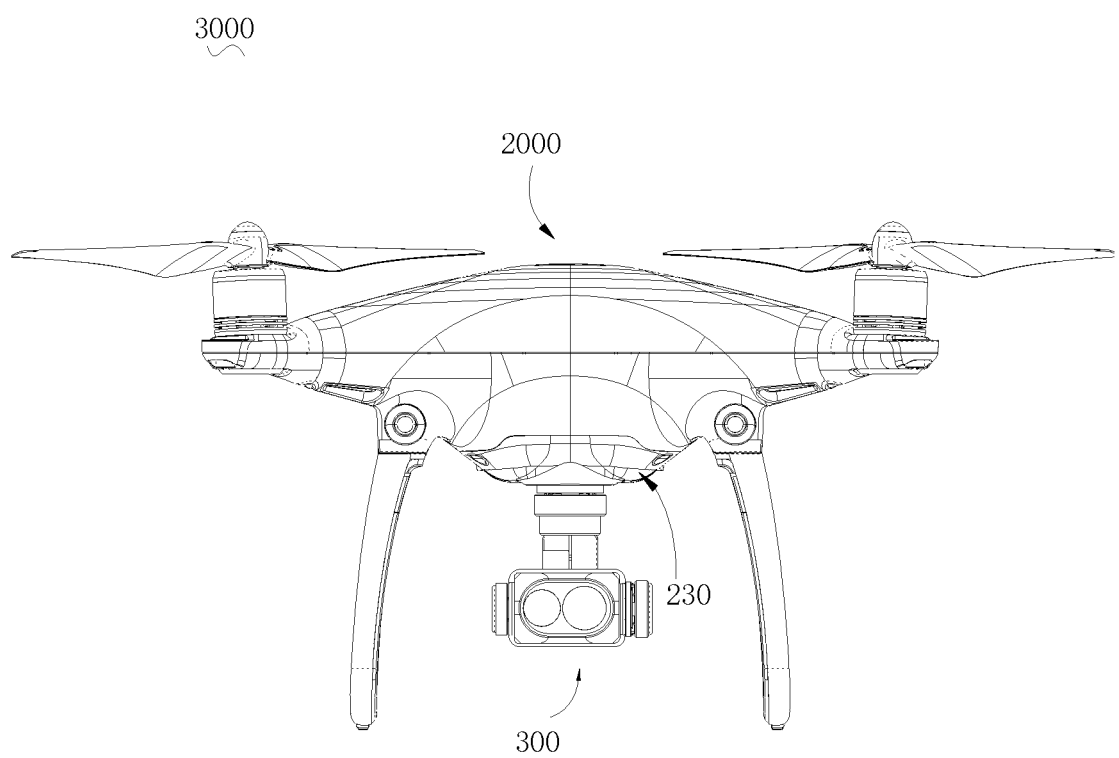
FIG. 19 is a schematic structural diagram of a mobile platform system according to some embodiments of the present disclosure.

Referring to FIG. 19, the present disclosure further provides a mobile platform system 3000. The mobile platform system 3000 includes the gimbal 300 of any of the above embodiments and the carrier 230. The gimbal 300 is mounted on the carrier. The mobile platform system 3000 further includes a mobile platform 2000. The carrier 230 includes a carrier frame. The carrier frame is mounted on the mobile platform 3000. The mobile platform 3000 may be a platform capable of moving such as an unmanned aerial vehicle, an unmanned vehicle, an unmanned ship, a car, a ship, and a robot. For example, when the mobile platform 3000 is an unmanned aerial vehicle (UAV), the carrier frame may be fixedly mounted under the UAV. The gimbal 300 is mounted on the carrier frame. The mobile platform system 3000 may further include a load, such as a camera, to capture images.

Please refer to FIG. 2, in the computer-readable storage medium 4000 and the mobile platform systems 3000 and 1000, a sleeping mode is added. When the gimbal 300 needs to be stopped from use temporarily, the cellphone does not need to be removed from the gimbal 300. The gimbal 300 may enter into the sleeping mode. In the sleeping mode, the user may push or pull the frame 310 to any position and cause the frame 310 to be near the arbitrary position. In some embodiments, the arbitrary position may correspond to the actual joint angle. During the push-pull process, the processor 301 may always obtain the current target joint angle according to the actual joint angle and control the motor 320 according to the current target joint angle. If the user no longer pushes or pulls the frame 310, the processor 301 may control the motor 320 to cause the motor 320 to be located at or near the current target joint angle. Thus, the frame 310 and the cellphone fixed at the frame 310 may be pushed to the arbitrary position, and the frame 310 may be caused to be near the arbitrary position. In the arbitrary position, a position suitable for the user to make phone calls or browse the captured images always exists. As such, the gimbal may adapt to the angle needs of different users for operating the cellphone. The user may adjust the angle of the cellphone according to the operation habit to adapt to the needs of each person for making phone calls or browsing the captured images. Moreover, in the sleeping mode, the cellphone may not need to be removed from the gimbal 300, and the handle of the gimbal 300 may not need to be hold on, the phone call may be made or the captured image may be browsed. The frame 310 will not swing back and forth, the operation may be very convenient.

In the description of this specification, description referring to the terms "one embodiment," "some embodiments," "exemplary embodiments," "examples," "specific examples," or "some examples," means that specific features, structures, materials, or characteristics described in connection with embodiments or examples are included in at least one embodiment or example of the present disclosure. In this specification, the schematic description of the above terms does not necessarily refer to a same embodiment or example. The described specific features, structures, materials, or characteristics may be combined in any suitable manner in any one or more embodiments or examples.

Any process or method description described in the flowchart or described in other ways may be understood as a module, segment, or part of code that includes one or more executable instructions for performing specific logical functions or steps of a process. The scope of embodiments of the present disclosure includes additional executions, which may not be in the order shown or discussed, including executing functions in a substantially simultaneous manner or in the reverse order according to the functions involved, which should be understood by those skilled in the art to which embodiments of the present disclosure belong.

What is claimed is:

1. A control method of a gimbal comprising:
in response to the gimbal being in a sleeping mode and receiving a pull operation or a push operation on a frame of the gimbal to rotate the frame from a first position to a second position different from the first position, obtaining a current target angle according to an actual angle of a motor arranged at the frame and configured to rotate the frame, the actual angle of the motor corresponding to the second position of the frame; and
controlling the motor according to the current target angle.

2. The control method of claim 1, wherein obtaining the current target angle according to the actual angle of the motor includes:
obtaining the current target angle according to the actual angle of the motor, a predetermined correction angle, and a last moment target angle.

3. The control method of claim 2, wherein obtaining the current target angle according to the actual angle of the motor, the predetermined correction angle, and the last moment target angle includes:
determining a current deviation according to the actual angle of the motor and the last moment target angle;
determining a control error according to the current deviation and the predetermined correction angle; and
determining the current target angle according to the control error and the last moment target angle.

4. The control method of claim 3, further comprising:
in response to the current deviation being smaller than the predetermined correction angle, determining the current target angle as the last moment target angle;
wherein determining the control error according to the current deviation and the predetermined correction angle includes, in response to the current deviation being greater than the predetermined correction angle, determining the control error according to the current deviation and the predetermined correction angle.

5. The control method of claim 2, wherein:
the predetermined correction angle is within a range of (0, 10].

6. The control method of claim 1, wherein obtaining the current target angle according to the actual angle of the motor includes:
determining the current target angle according to the actual angle of the motor, a predetermined correction angle, a last moment target angle, and a predetermined ratio coefficient.

7. The control method of claim 6, wherein determining the current target angle according to the actual angle of the motor, the predetermined correction angle, the last moment target angle, and the predetermined ratio coefficient includes:
determining a current deviation according to the actual angle of the motor and the last moment target angle;
determining a control error according to the current deviation and the predetermined correction angle; and
determining the current target angle according to the control error, the predetermined ratio coefficient, and the last moment target angle.

8. The control method of claim 6, wherein:
the predetermined ratio coefficient is within a range of (0, 1].

9. The control method of claim 1, further comprising:
in response to receiving a sleep instruction, controlling the gimbal to enter the sleeping mode.

10. The control method of claim 1, further comprising:
when the gimbal is in the sleeping mode, and before receiving the pull operation or the push operation on the frame, controlling the motor to maintain at a predetermined angle, the predetermined angle being a last moment target angle before the user performs the pull operation or the push operation on the frame.

11. The control method of claim 10, further comprising:
receiving a power-on instruction;
controlling the gimbal to perform an initialization process according to the power-on instruction;
controlling the gimbal to operate in a stabilization mode; and
in response to receiving a sleep instruction, controlling the gimbal to enter the sleeping mode.

12. The control method of claim 11, wherein:
the stabilization mode includes at least one of a follow mode or a lock mode.

13. The control method of claim 11, wherein controlling the gimbal to enter the sleeping mode includes:
controlling the motor to accelerate and rotate and then decelerate and rotate until the motor rotates to and maintains at the predetermined angle.

14. The control method of claim 11, wherein controlling the gimbal to enter the sleeping mode includes:
controlling the motor to accelerate and rotate to reach a maximum speed, rotate at the maximum speed, and decelerate and rotate until the motor rotates to and maintains at the predetermined angle.

15. The control method of claim 1, further comprising, when the gimbal is in the sleeping mode:
in response to receiving a wake-up instruction, controlling the gimbal to perform an initialization process.

16. The control method of claim 1, further comprising, when the gimbal is in the sleeping mode:
in response to receiving a power-off instruction, controlling the gimbal to power off.

17. The control method of claim 1, wherein controlling the motor according to the current target angle includes:
in response to ending of the pull operation or the push operation on the frame, controlling the motor according to the current target angle to cause the motor to be located at or near the current target angle.

18. The control method of claim 1, further comprising:
in response to receiving a sleep instruction, controlling the gimbal to enter the sleeping mode, including controlling the motor to accelerate and rotate and then decelerate and rotate until the motor rotates to and maintains at a predetermined angle.

19. A gimbal comprising:
a frame;
a motor arranged at the frame and configured to rotate the frame; and
a processor electrically connected to the motor and being configured to:
in response to the gimbal being in a sleeping mode and receiving a pull operation or a push operation on the frame to rotate the frame from a first position to a second position different from the first position, obtain a current target angle according to an actual angle of the motor, the actual angle of the motor corresponding to the second position; and control the motor according to the current target angle.

20. A mobile platform system comprising:

a carrier; and a gimbal mounted at the carrier and including:
- a frame;
- a motor arranged at the frame and configured to rotate the frame; and
- a processor electrically connected to the motor and being configured to:
  - in response to the gimbal being in a sleeping mode and receiving a pull operation or a push operation on the frame to rotate the frame from a first position to a second position different from the first position, obtain a current target angle according to an actual angle of the motor, the actual angle of the motor corresponding to the second position; and
  - control the motor according to the current target angle.

* * * * *